United States Patent [19]
Wolf et al.

[11] Patent Number: 5,323,307
[45] Date of Patent: Jun. 21, 1994

[54] POWER MANAGEMENT AND AUTOMATION SYSTEM

[75] Inventors: Robert L. Wolf, Winchester; Stanley J. Brooks, Lexington, both of Ky.

[73] Assignee: Square D Company, Palatine, Ill.

[21] Appl. No.: 620,237

[22] Filed: Nov. 29, 1990

[51] Int. Cl.$^5$ ............................................. G06F 15/20
[52] U.S. Cl. ..................................... 364/140; 364/492
[58] Field of Search ............... 364/140, 141, 483, 492; 361/166–169.1, 189–193

[56] References Cited

U.S. PATENT DOCUMENTS

| | | | |
|---|---|---|---|
| 4,964,058 | 10/1990 | Brown, Jr. ........................ | 364/492 |
| 4,965,694 | 10/1990 | Dvorak et al. .................. | 361/169.1 |
| 4,977,515 | 12/1990 | Rudden et al. .................. | 364/492 |
| 5,175,677 | 12/1992 | Kushiro et al. .................. | 364/140 |

*Primary Examiner*—Jerry Smith
*Assistant Examiner*—Steven R. Garland
*Attorney, Agent, or Firm*—Larry I. Golden; Kareem M. Irfan

[57] ABSTRACT

An automation and energy management system includes an automation panel box which may be positioned adjacent to a circuit breaker panel box. The automation panel box includes one or more circuit breaker control modules, one or more device control modules and a power module for providing power to the control modules. The circuit breaker control module provides signals to operate motorized circuit breakers, so as to turn on or off the power to a device being managed and the device control module provides signals to control individual appliances. Each of the two control modules is capable of controlling up to eight different circuit breakers or eight different individual devices and each includes a manual override button for each breaker or device controlled, which override button can be manually pressed by a person desiring to override the automation and energy management control. Each control module includes a counting circuit which sequentially enables one of several toggle circuits that sustains the state of each circuit breaker (or appliance switch). A facility computer generally communicates with the modules over a bus and issues commands to cause certain automatic functions of energy management to occur.

16 Claims, 6 Drawing Sheets

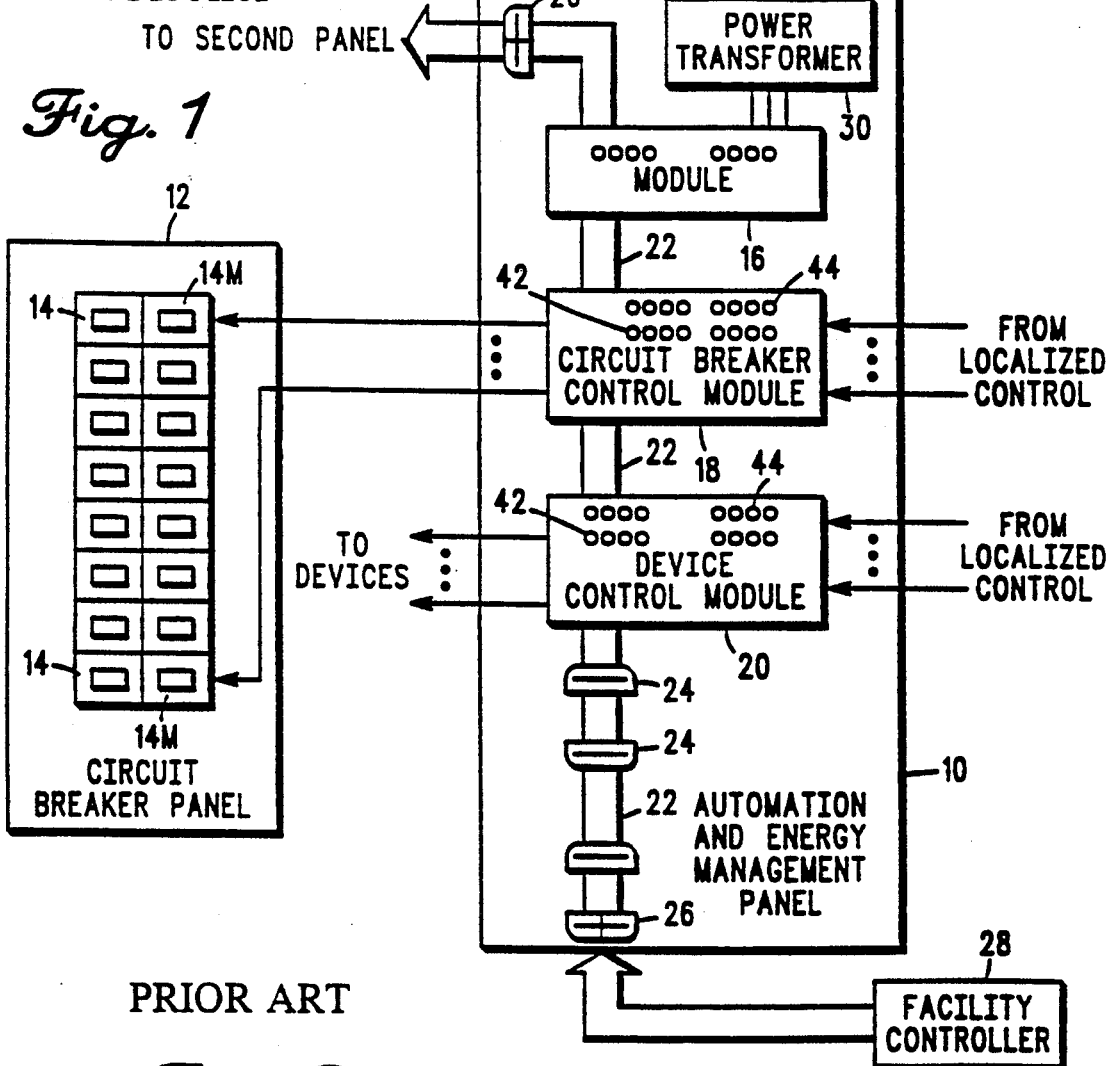
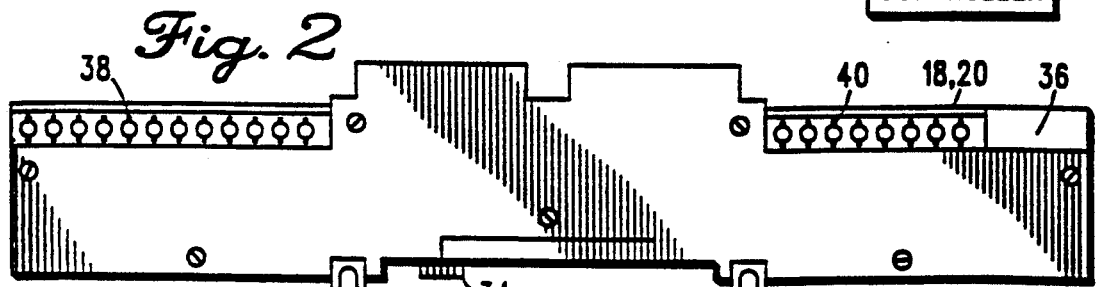
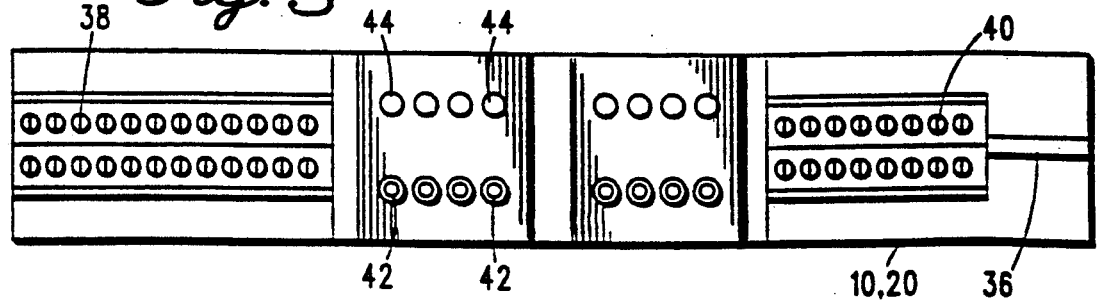

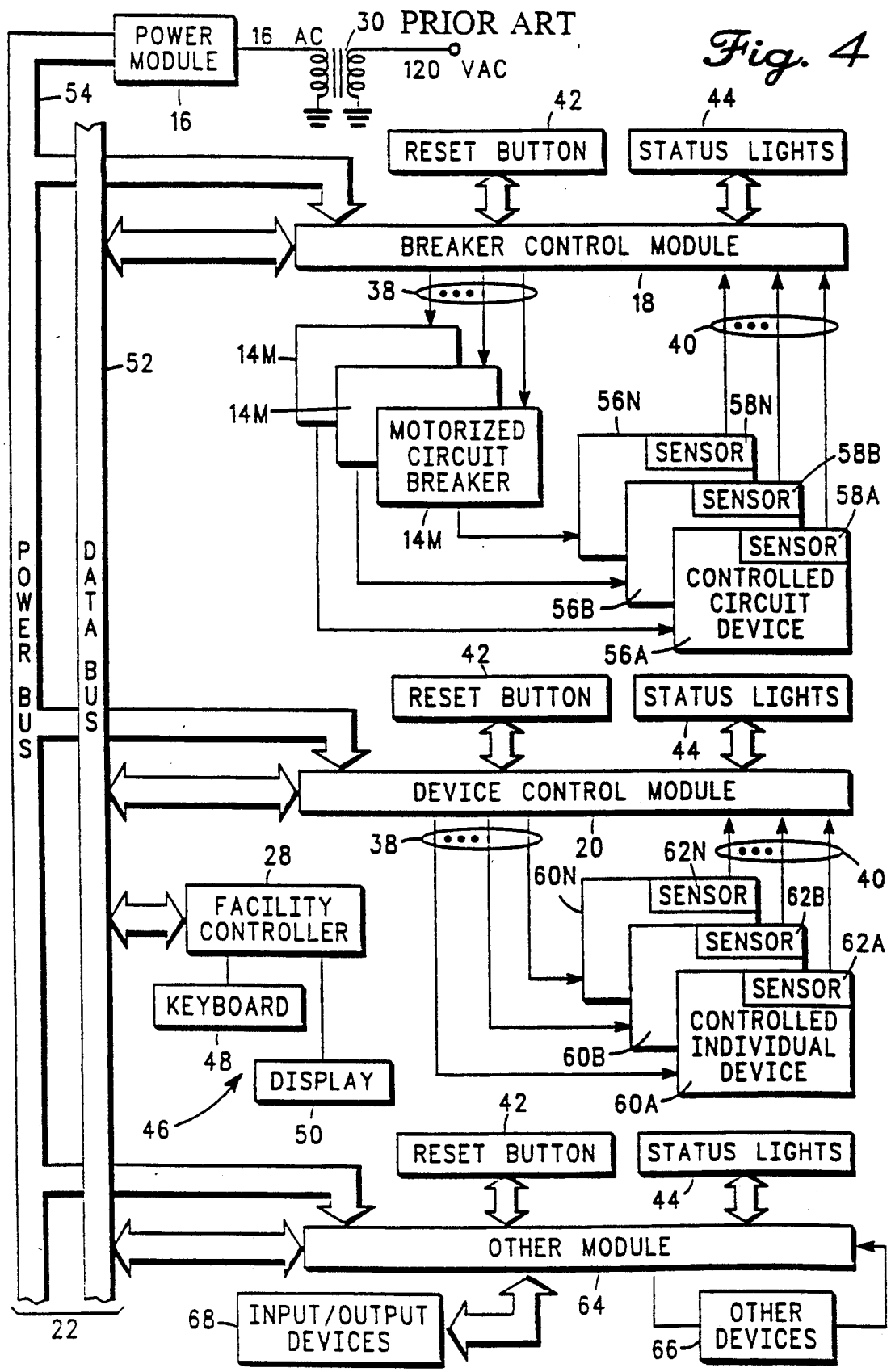

POWER MANAGEMENT AND AUTOMATION SYSTEM

FIELD OF THE INVENTION

This invention relates to a power management and automation system, and more particularly, to such a system for managing the power consumption of selective appliances and controlling the operation of such appliances in a single facility, such as the home.

BACKGROUND OF THE INVENTION

Energy management and home automation has been known for many years. However, practical systems at reasonable cost, permitting effective energy usage control and functionally controlling the operation of various home appliances, still have not been developed. To the extent that such energy control and automation systems have been developed, the homeowner becomes a slave to the automatic system, rather than the automatic system being an aide to the homeowner. For example, systems exist to automatically turn on the lights at a certain time and turn them off at a second certain time. However, in some situations, the homeowner may desire that the lights be off when the computer has been set to keep them on. In such a situation, the homeowner must reprogram the computer, rather than merely turn the lights off by simply flipping a switch.

Examples of typical prior art automation and energy management systems are shown in U.S. Pat. No. 4,740,882 in the name of Miller, U.S. Pat. No. 4,695,880 in the name of Johnson et al., U.S. Pat. No. 4,684,920 in the name of Reiter, U.S. Pat. No. 4,642,473 in the name of Bryant, U.S. Pat. No. 4,611,295 in the name of Fowler, U.S. Pat. No. 4,540,984 in the name of Waldman, U.S. Pat. No. 4,497,031 in the name of Froehling et al., U.S. Pat. No. 4,471,232 in the name of Peddie et al., U.S. Pat. No. 4,454,509 in the name of Burnnagel et al., U.S. Pat. No. 4,418,333 in the name of Schwarzbach et al., U.S. Pat. No. 4,389,577 in the name of Anderson et al., U.S. Pat. No. 4,354,120 in the name of Schonnack, U.S. Pat. No. 4,345,162 in the name of Hammer, U.S. Pat. No. 4,319,319 in the name of Wygant, U.S. Pat. No. 4,264,960 in the name of Gurr, U.S. Pat. No. 4,244,022 in the name of Kendall, U.S. Pat. No. 4,223,379 in the name of Simcoe, U.S. Pat. No. 4,217,646 in the name of Caltagirone et al., U.S. Pat. No. 4,213,182 in the name of Eichelberger et al., U.S. Pat. No. 4,022,555 in the name of Smith, U.S. Pat. No. 3,906,242 in the name of Stevenson and U.S. Pat. No. 3,790,815 in the name of Karklys. Other energy managements systems are described in PCT Patent Application Number PCT/US. 87/02365, entitled "Energy Management System" in the name of Brown, Jr. et al., and French Patent 2,495,396 in the name of Pillebout.

It is also well known that each electrical power circuit in a building, such as a home, factory or the like, are protected by a fuse device, such as a circuit breaker, against power surges and overloads. Many appliances to be monitored, such as pumps and major appliances are included as the only power consuming appliance in the circuit, that is, the circuit breaker is designed to protect only that appliance. Other types of appliances, such as lights, small kitchen appliances and the like, may be grouped together in a single power circuit and share a common circuit breaker.

Where circuit breakers are used to protect the power circuit, the circuit breakers may include a small electric motor, which responds to appropriate electric controls signals for automatically tripping, setting or resetting the circuit breaker from a remote location. One significant difference between those appliances included with their own circuit breaker is that normally those appliances having their own circuit breaker are almost universally subject to automation and energy management, whereas only certain of the appliances plugged in to a multi appliance circuit will be energy managed and subject to automation. The motorized circuit breaker has been used in the past as a convenient element to manage the application of power to those single appliance circuits. Such motorized circuit breakers can be turned off at those desired times when it is desired that they not operate, such as the middle of the night for water heaters.

In order to have a fully automated facility, many times it is desirable for external signals, indicating a certain status, to be provided to the automation equipment in order to determine whether an appliance or device should be turned on or off. For example, if an automatic sprinkler system pump is being controlled by the automation system, it is desirable that system know whether the grass needs to be watered. Moisture sensing transducers or rain gauge transducers are well known and can provide such a signal indicating whether the ground is already moist or whether an adequate amount of rain has fallen. If such signals are provided, the automation system should respond thereto by not turning on the sprinkler system. Another example is an automatic light control system which may automatically turn on the lights as a certain time, such as dusk, and turn off the lights at a certain time, such as dawn. Optical sensors are well known devices to control such outdoor lights. In some circumstances, the homeowner desires to be able to override the sensor of the automation system. Many prior art devices would require the homeowner to reprogram a computer system, rather than simply operate a switch to reverse the automation systems sensor commands.

The automation system may additionally include items which are not typically subject to energy management such as being turned on and off. For example, the automation system may include a security system which responds upon sensing the opening or closing of windows or doors or the detection of a person by motion or heat sensing equipment. Upon detecting a breach of security, the automation system should automatically call for assistance or sound an alarm. Such a system can be incorporated into an overall automation system to automatically be turned on during certain hours, such as the middle of the night or the normal daylight hours when all family members are working or in school. However, such security systems must be easily reset whenever a family schedule change occurs, such as a person arriving home late in the evening or staying home from work due to illness, vacation, holidays and the like. Such resetting must be as simple as existing free standing systems by operating an encoded switch or the like, and not by reprogramming a computer.

In many energy management and home automation systems, it is not practical in every instance to send the status signals determining whether automation should occur or the homeowner override signals back to the central automation computer. For one thing, a computer would become overburdened in monitoring so many signals and this would result in delays between the sending of a signal and the servicing of a signal. For example, when the computer polling or being interrupted by a plurality of a status or override signals becomes backlogged by servicing too many requests, a person could walk into a room and find the lights would not go on for several seconds after the switch was turned, the police would be called before the security system override code was recognized and acted upon by the computer. To solve this problem, some mechanism, which is independent of the automation computer must be developed to override the computer's commands. In addition, it is further necessary that the homeowner have the final determination of whether the status signals are to be followed. For example, despite the fact a status signal indicates that sufficient rain has fallen so as to prevent the turning on of the automatic sprinkler system, the homeowner may desire the system be turned on for other reasons, such as newly planted grass. Hence, overall override means must be provided under the control of the homeowner to override either the automation system, as determined first by the computer system or, second, as determined by the response to the status signals.

SUMMARY OF THE INVENTION

In accordance with one aspect of this invention, there is provided a power management and automation system for controlling the operation of a plurality of appliances in a facility. In one embodiment, a control module responds to a programmable controller so as to provide selected command signals to a plurality of appliance switches. The module includes a plurality of toggle circuits, each respectively connected to one of the appliance switches and responsive to a signal provided by the programmable controller. A counter circuit sequentially enables each of the toggle circuits so that only one appliance switch is controlled at a time. A plurality of manual switches, e.g., push-buttons, provides an override function to each of the toggle circuits.

BRIEF DESCRIPTION OF THE DRAWINGS

Other objects and advantages of the present invention will become apparent upon reading the following detailed description and upon reference to the drawings in which:

FIG. 1 shows the arrangement of a circuit breaker panel and the computer automation and energy managing panel of the subject invention;

FIG. 2 is a side view of one of the control modules shown in FIG. 1;

FIG. 3 is a front view of the control module shown in FIG. 2;

FIG. 4 is an electrical block diagram of the system of the subject invention;

Figure 5:
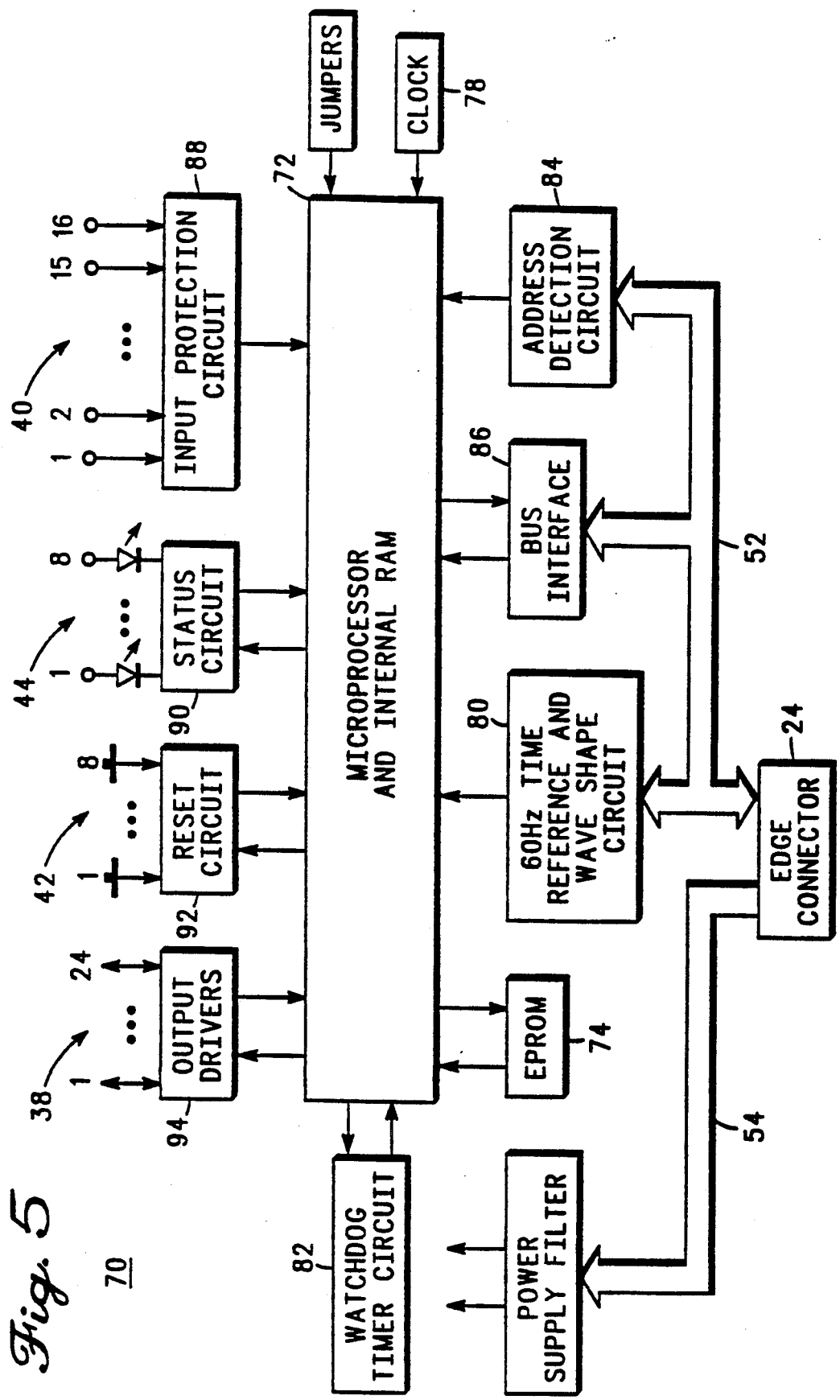
FIG. 5 is a block diagram of the internal circuitry of the breaker control module or point of use module shown in FIGS. 1 and 3.
Figure 6:
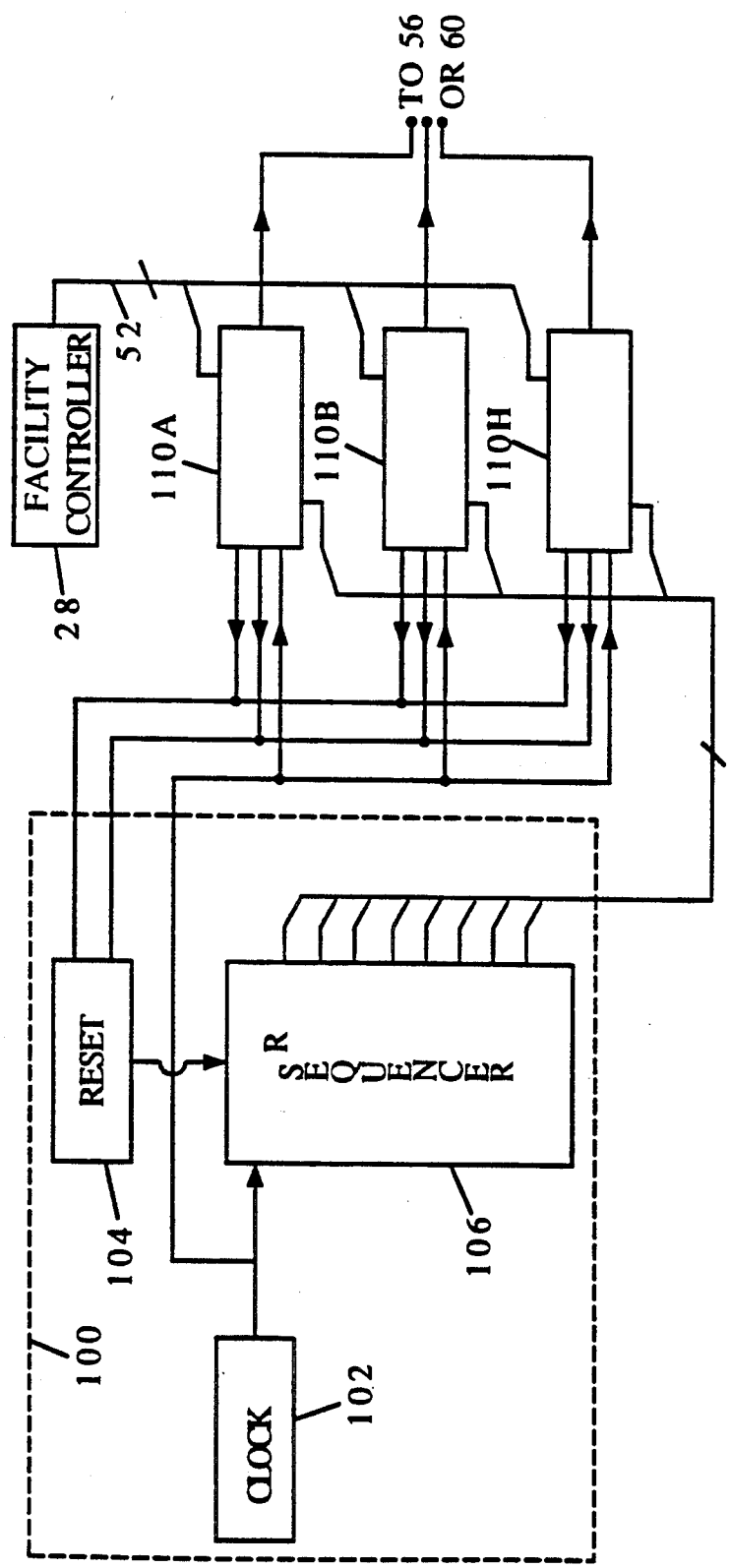
FIG. 6 is a block diagram of the internal circuitry of the breaker control module or point-of-use module shown in FIGS. 2 and 3, according to a specific embodiment of the present invention.
Figure 7:
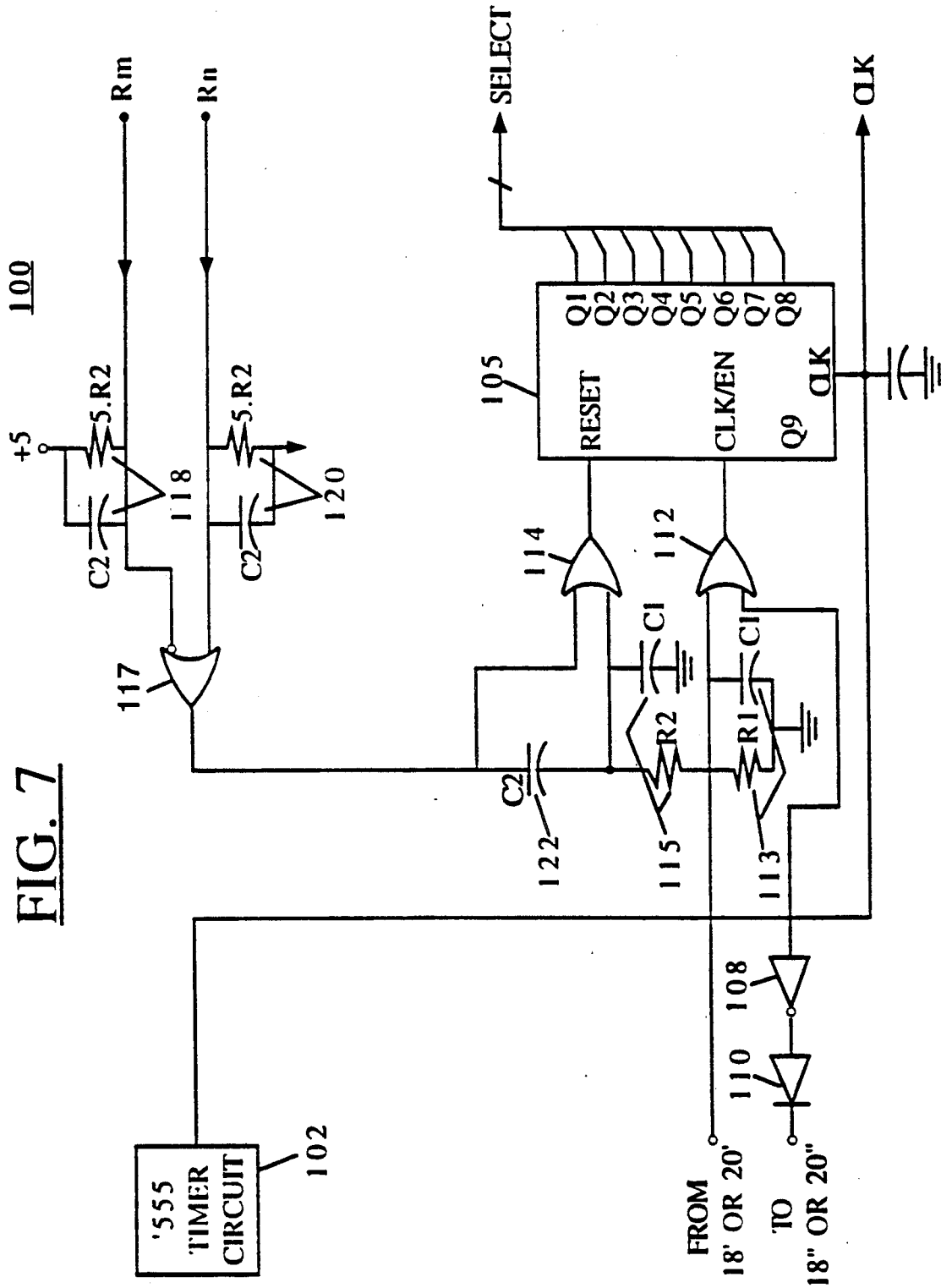
FIG. 7 is a circuit diagram of the control portion of the circuitry illustrated at FIG. 6.
Figure 8:
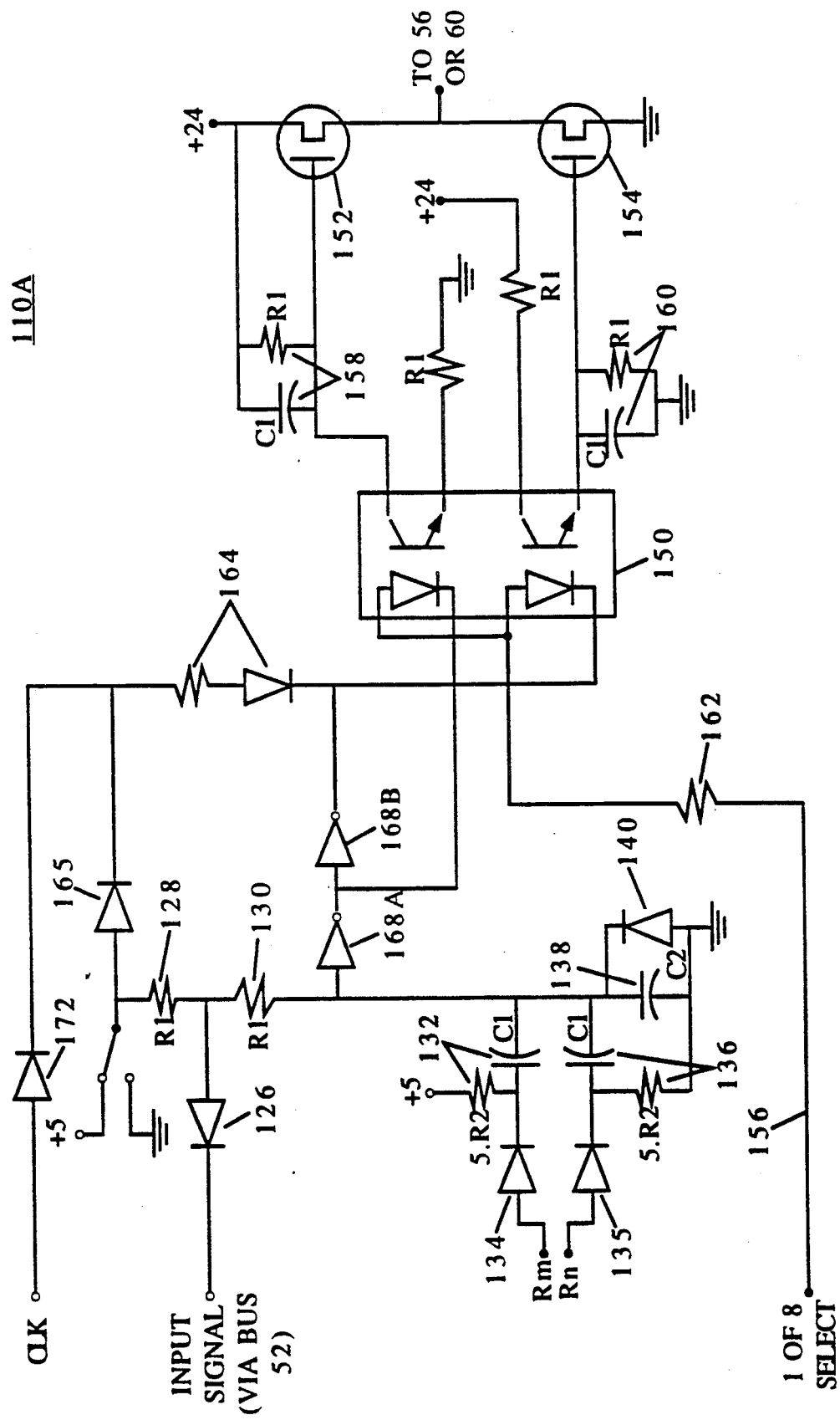
FIG. 8 is a circuit diagram illustrating one of a plurality of toggle circuits comprising the remaining portion of the circuitry illustrated at FIG. 6.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Referring now to FIG. 1, an automation and energy management panel 10 is shown which may be positioned adjacent a conventional circuit breaker panel 12. Each of the panels 10 and 12 may include an encloser, such as model number Q 040-M200 Manufactured by the Square D Company of Palatine, Ill. Each panel may further include a backplane (not shown) to which a module, such as circuit breakers 14 or module 16, are snap locked for being held in the panel boxes 10 or 12. The circuit breakers 14 may include manual circuit breakers 14 and motorized circuit breakers 14M. Motorized circuit breakers 14M may be controlled by signals applied to a small electric actuated motor included therein to automatically be switchable between the on and the off states. Both circuit breakers 14 and motorized circuit breakers 14M are commonly available for various amperage ratings in the marketplace, such as from the Square D Company.

It is well known that a circuit breaker, such as circuit breaker 14 or 14M, can protect a single electrical wiring circuit in a facility, such as the home from overloads and power surges. The protected circuit may have a single appliance or device associated therewith, such as a motor, water heater or the like, or may have a plurality of different appliances, such as lights and various small appliances connected through receptacles to the circuit. Whenever a circuit breaker 14 or 14M is in the on position, power may be applied to any or all of the appliances in that particular power circuit and when the circuit breaker 14 or 14M is moved to the off position, whether as a result of an overload or power surge or of a signal applied to a motorized circuit breaker 14M or of a person manually tripping the breaker, power is disconnected from that particular power circuit.

The automation and energy management panel 10 includes three principle types of modules inserted therein. These modules are the power module 16, the circuit breaker control module 18 and the device control module 20. Each automation and energy management panel 10 will include one power module 16, which is designed to provide power to the remaining modules. Any number, within the space limitations of panel 10 of circuit breaker control modules 18 or device control modules 20, may be inserted into panel 10 depending on the number of motorized circuit breakers 14M or individual devices to be controlled. Further, and as described hereafter, each of the circuit breaker control modules 18 and device control modules 20 may be designed to control up to eight different motorized circuit breakers 14M or individual devices.

Within panel 10, a backplane (not shown) is included and each of the modules 16, 18 and 20 are snap locked to the backplane. In addition, a wiring bus 22 is provided along the backplane and includes a plurality of multi-pin connectors 24 into which each of the modules 16, 18 and 20 are connected. Each of the connectors 24 may be hard wired with a different address to permit a computerized facility controller 28, described in more detail hereafter, to communicate therewith. To avoid confusion, the power module 16 is always inserted into the top, or first, connector 24 and the control modules 18 and 20 are inserted in any order into the next successive lower connectors 24. The ends of wiring bus 22 each include a pair of connectors 26, such as conventional RJ-11 telephone jacks, which may be used to couple wiring bus 22 to a facility controller 28 or to a second panel, similar to panel 10, containing additional circuit breaker and device control modules 18 and 20.

Power module 16 receives 24 volt a.c. power from a power transformer 30, which steps down the normal line current of 120 volts a.c. or 277 volts a.c. to 24 volts a.c. The power module 16 regulates the a.c. signal provided thereto and provides a 24 volt d.c. and a pair of 5 volt d.c. signals over wiring bus 22 to the various modules 18 and 20 plugged into connectors 24 of wiring bus 22. The two 5 volt d.c. signals provided by power module 16 are applied to different ones of the circuit breaker control modules 18 and device control modules 20 in order to prevent undue loading on the 5 volt d.c. signal. The front of power module 16 includes three light emitting diodes (LEDs) which, when illuminated, indicate that the proper power is being applied from power module 16.

The circuit breaker control module 18 and device control module 20 are identical, except for the type of output signal applied therefrom. The output signal from circuit breaker control module 18 is designed to actuate the motor included in one of the motorized circuit breakers 14M contained in panel 12. Such actuation may be from the off to the on state or from the on to the off state as desired. Typically, this signal is a short pulse of, for instance, 75 milliseconds. The output signals from device control module 20 may be pulses or steady state digital signals designed to control other remote devices by, for example, permitting the application of power thereto or preventing the application of power thereto or causing a certain function to be performed. The other remote devices may have motors which can be actuated to turn a switch from one to another position, or may have relays which are maintained open or closed. Alternatively, the remote device controlled by device control module 20 may, itself, be computer controlled by its own internal computer or by facility controller 28, and would merely be looking for a change of state of the signal provided thereto from module 20 and respond thereto in an appropriate programmed manner. For example, an automatic telephone dialing system may dial an emergency number, such as 911, in response to a signal from module 20 going from a low to a high state.

Each of the modules 18 and 20 are also capable of receiving signals from external sources in addition to the signals received over bus 22 from facility controller 28. The external sources may be the device being controlled or a sensor associated with the device being controlled. For example, once an automatic telephone dialing system dialed the 911 number, it could send an acknowledgement signal back to control module 20. Alternatively, event signals could be sent to modules 18 or 20 to override preprogrammed commands from facility computer 28. For example, a lawn sprinkler motor may be preprogrammed to turn on at a certain time and the override status signal from a rain gauge may prevent such action if it detects the lawn is sufficiently wet or if it is raining.

Lastly, each of the control modules 18 and 20 include an override button 42 and status light 44 for each of the motorized circuit breakers 14M or devices being controlled. The override buttons 42 may be actuated by a person to override all other commands from facility controller 28 or from the external signals and the status lights, by being on, off or flashing, indicate the then existing status of the control function.

Referring now to FIGS. 2 and 3, the physical characteristics of control modules 18 and 20 is shown with FIG. 2 showing a side view and FIG. 3 showing a facing or front view of one of the modules 18 or 20. Each of the modules 18 and 20 include a pair of clips 32 designed and positioned to be snap-locked into a conventional backplane used with panel 10. In addition, a male connector 34 extends from the bottom of modules 18 or 20 and is adapted to be plugged into one of the module female connectors 24, shown in FIG. 1. When connector 34 is inserted into connector 24, power from power module 16, as well as control signals from facility controller 28, may be provided to the circuit elements contained on printed circuit board 36 contained within module 18 or 20. Also connected to circuit board 36, is twenty-four output terminals 38 and sixteen input terminals 40, each of which is adapted to having a single wire secured thereto. The sixteen input terminals 40 may be grouped into eight pairs to provide a pair of wires from each external source, such as the device being controlled by one of the modules 18 or 20. Similarly, the output modules contained eight groups of three terminals, so as to permit three wires to be provided to each of the motorized circuit breaker 14M or devices being controlled. Where a motorized circuit breaker 14M is being controlled, the three wires of each group may be designated as a motor forward, a motor reverse, and a common wire. Where an individual device is being controlled, the three output terminals of each group may be designated as a normally open contact, a normally closed contact and a common wire.

Eight manual override switch buttons 42 and eight status light emitting diodes (LED) 44 are provided on the face of modules 18 and 20. Switches 42 may be depressed by the user, such as the homeowner, of the automation and energy management system to override any command signals, such as the external signals from the devices being controlled or the command signals from facility controller 28. The LEDs 44 may be illuminated, not illuminated or flashing, possibly at several different rates, to provide various status indications of whether one of the devices being controlled is on or off, or the type of control then occurring.

The power module 16 is identical to the modules 18 and 20 shown in FIG. 2, with the exception that output terminals 38 and input terminals 40 are not present and the front panel only includes three light emitting diodes, respectively representing the two plus five volt d.c. signals and the plus 24 volt d.c. signal provided by power module 16.

Referring now to FIG. 4, an electrical block diagram illustrating an automation and energy management system 46 is shown. System 46 may, for example, be a single home in which certain devices are managed for energy usage and certain other devices are automated. In FIG. 4, elements previously described are given like numerical designations. The heart of system 46 is the facility controller 28. Facility controller 28 may be a conventional personal computer, such as an I.B.M. personal computer XT, or compatible or a specially modified computer device adapted specifically for the automation and energy management function described herein. Controller 28 will typically have a keyboard 48 and display 50 attached thereto in a conventional manner for permitting the entrance of data through the keyboard 48 or the display of messages to the user through display 50. Controller 28 may additionally have other devices attached thereto, such as memories, modems, printers and the like commonly found with personal computers, or it may have specially adapted devices attached thereto, such as security systems, video control systems, telephone systems and the like.

Facility controller 28 provides the control signals to a data bus 52, which is coupled, through connector 26 in FIG. 1, to be a part of wiring bus 22 in panel 10. The signals provided by controller 28 to data bus 52 will typically identify the address of a particular one of the modules 18 or 20 and, within that addressed module, which one of the eight circuit breakers or devices is to be controlled. The address of each module 18 or 20 is determined by the address code pre-wired in the connector 24, as previously discussed. Additionally, the facility controller 28 signal will manifest a data code, such as indicating whether a switch should be turned on or off.

As previously mentioned, power module 16 responds to a 16 volt a.c. signal provided thereto from transformer 30, which, in turn, responds to the line voltage (typically 120 volts a.c. in a home). Power module 16 converts the a.c. signal to three d.c. signals (+5 volts, −5 volts and +24 volts) by using conventional voltage regulator circuits, and these three d.c. signals are provided from power module 16 to power bus 54. In addition, power module 16 provides 8 volt a.c. and 24 volt a.c. signals, together with d.c. and a.c. ground signals to power bus 54.

As previously described, both circuit breaker control module 18 and device control module 20 have eight reset switch buttons 42 and eight status lights 44 interconnected therewith. Further, each of modules 18 and 20 provide eight sets of input signals over connectors 40. Specifically, with respect to circuit breaker control module 18, up to eight motorized circuit breakers 14M may be coupled to the output connectors 38 as previously described. Appropriate signals provided from module 18 can cause the motor associated with any one of the motorized circuit breakers 14M to be forced to the on (closed) or off (open) condition. Module 18, thus, is typically used to control devices which are the only devices within a particular power circuit within the facility. For example, motors, water heaters, and the like normally are wired as the only energy consuming device in a power circuit, which of course, contains a circuit breaker. By making the circuit breaker of such power circuits a motorized circuit breaker 14M, the operation of such appliance itself may be easily controlled by simply controlling the motorized circuit breaker 14M. Since control panel 10 may be placed near circuit breaker panel 12, wiring is minimized between the circuit breaker control module 18 and the motorized circuit breaker 14M, as compared to providing wires to, for example, a remote relay for remotely controlling lights located outside the home.

Each power circuit protected by a motorized circuit breaker 14M provides power to one of the controlled circuit devices 56a through 56n, which may be a hot water heater, or a motor, for example, used for sprinkling the lawn or filtering a swimming pool. Each of these devices 56a through 56n may have a sensor either associated therewith, such as a thermostat, in the case of the water heater, or a sensor located remotely therefrom, such as a moisture sensor or rain gauge associated with a lawn sprinkling pump. Some, but not necessarily all, of the sensors 58a through 58n provide status signals to connector 40 to breaker control module 18. For example, sensor 58b may be a thermostat associated with a hot water heater device 56b which turns heating element in device 56b on and off based upon its setting relative to the temperature of the water. Depending upon the degree of automation desired, it may be unnecessary for thermostat sensor 56b to provide its signal to breaker module 18. In this case, no signals are applied to the terminal connectors of terminal 40 with respect to the second device being controlled 56b. Other sensors, such as 58n, may be located remotely from the device being controlled 56n, such as a moisture sensor which is used to determine whether or not a sprinkler pump should be turned on. Other sensors, such as a photo cell associated with outside lights may be physically connected to the device under control as indicated by sensor 58a associated with device 56a and which provides a signal directly to module 18.

Device control module 20 is similar to circuit breaker control module 18, except that the signals provided through output terminals 38 are provided directly to the controlled individual devices 60a through 60n. Selected ones of the controlled unit 60a through 60n also have a sensor 62a through 62n associated therewith in the same manner as sensors 58a through 56n. In other words, some sensors may be totally remote, others may be physically connected with the device under control and still other units 60a through 60n under control may have no sensor. Again, signals are provided through the output terminals 38 to control the various controlled individual devices 60a through 60n, that is, to turn them on or turn them off or to cause them to perform a particular function. The sensors 62a through 62n may indicate, for example, whether the sensor is on or off or whether it should be turned on or off or may constitute an acknowledgment that the commanded function has been performed. The sensors 62a through 62n may also indicate a manual command, such as an override, by the homeowner. In other words, if one of the controlled individual units 60 is a motorized light switch for a room, the sensor 62 associated with that unit could be an indication of whether the homeowner has physically turned the switch on or off. In this case, that would override whatever the facility controller 28 instructed module 20 to do with respect to that device.

In addition to the principle circuit breaker control module 18 and device control module 20 shown in system 46, other modules 64, which may or may not include reset buttons 42 or status lights 44, may be inserted into panel 10. Such other modules may be used to control security or to control certain specialized appliances, such as video tape recorders and the like. Generally, the other modules 64 will operate on other devices 66 and receive status signals from other input device 68. They may also provide signals to the other inputs/outputs devices 68 to control them, as well as receive status signals therefrom. While the other modules are shown in system 46 as receiving signals from facility controller 28, this may or may not be the case in that they may be totally independent of facility controller 28 or may be coupled thereto only to provide status information rather than to receive control.

Referring now to FIG. 5, a block diagram of the electronic system 70 within one of the modules 18 or 20 is shown. Components previously described are given the prior identification numbers. The heart of system 70 is an eight-bit microprocessor, which includes internal random access memory (RAM), such as the Motorola microprocessor number 63705. Microprocessor 72 is under the control of a program contained in the EPROM 74, that determines the functions microprocessor 72 performs. The functions may be varied depending on the setting of jumpers 76 associated with microprocessor 72.

Microprocessor 72 operates under the control of 4.9152 MHz crystal oscillator clock 78. Synchronization is maintained by the 60 Hertz timing reference and wave shaping circuit 80 which synchronizes microprocessor 72 with the other similar microprocessors within the other modules 18 or 20. Such synchronization is necessary because facility controller 28 only communicates with one module 18 or 20 at a time over bus 52. Thus, the various microprocessors similar to 72 and the other modules are merely waiting for access to bus 52 and should be synchronized based on a common stable frequency.

The watchdog timer circuit 82 is an internal supervisor and monitor for microprocessor 72. Microprocessor 72 periodically sends acknowledgement signals to watchdog timer circuit 82 to indicate that it is properly functioning without any disturbances. If these acknowledgments signals are too late or too early, watchdog circuit 82 resets processor 72.

Communication between microprocessor 72 and facility controller 28, shown in FIG. 4, is over bus 52. This communication is controlled by the address detect circuit 84 and the bus interface circuit 86. As previously mentioned, the address of each module 18 or 20 is hard wired into connector 24; when an appropriate address is provided over bus 52, the address detector 84 detects that address based on the hard wired connector 24 and permits microprocessor 72 to have access to bus 52 by opening bus interface circuit 86.

Each of the input lines connected to input terminal 40 are provided through an input protection circuit 88. Microprocessor 70 continually monitors the signals provided to input protection circuit 88 and notes any change therein requiring a change in the output signals. Some status signal changes will result in immediate action by microprocessor 74 and others will be stored in the internal RAM to inhibit action in response to commands from facility controller 28. Similarly, the status lights 44 are in communication with microprocessor 70 through a status circuit 90 and the reset buttons 42 are in communication through a reset circuit 92. Microprocessor 72 is programmed to provide signals to illuminate the various status lights 44 or check whether a light is on or off through status circuit 90. Similarly, microprocessor 72 monitors communication with the reset buttons 42 through reset circuit 92 in that it can send signals to the buttons or receive signals whenever one of the buttons 42 is depressed.

The output signals provided over terminals 38 are provided through output drivers 94. Again, output drivers 94 are coupled to be in two way communication with microprocessor 72 in that microprocessor 72 can provide signals through output driver circuit 94 to any one or more of the 24 output terminals or it can read the signal on any of the output terminals. The type of driver circuits included in output driver circuit 94 will depend upon whether a motorized circuit breaker 14M or a device 60a–60n is being controlled. This circuit is the only one which will differ between the circuit breaker control module 18 and the device control module 20.

As is apparent from FIG. 5, microprocessor 72 may be controlled from three different sources. These three sources would be the facility controller 28, the status signals provided input protection circuit 88 and the manual operation of one of the reset buttons 42. Under some circumstances, microprocessor 72 could receive conflicting information from the three different inputs thereto. Thus, an order of prioritization is required and this order has been selected to be such that the highest priority is the push buttons 42, the next highest priority is the status signals applied through the input terminals 40 and the lowest priority is the commands from the facility controller 28. The reason for this order is that the highest priority is given to the human actions of depressing reset buttons 42 and the next highest priority is given to the status signals provided to terminal 40 because these signals manifest actual events occurring. The lowest priority is then the preprogrammed assumption of future events contained in facility controller 28.

Thus, the modular configuration of system 46, described herein, permits the ability to include a variety of different types of control modules, such as the power control modules 18 and 20, as well as other types of modules, such as telephone control, entertainment control and security control and so forth, into a common energy management and automation system, all primarily contained in panel 10. This permits easier wiring to permit the desired control and automation, as well as places many of the functions normally required to accomplish many different tasks at a common location.

An alternate arrangement for implementing the breaker control module 18 or point of use module 20 is described. Unlike the arrangement illustrated in FIG. 5, this alternate arrangement does not employ a microcomputer (or microprocessor) 72. Rather, processing of the signals from the facility controller 28, from the reset button 42 and to the status lights 44 is provided by control circuitry 100 and a plurality of (preferably eight) toggle circuits 110A–100H.

The control circuitry 100 includes an electronic clock generator 102, a reset circuit 104 and a sequencer circuit 106. Each of eight outputs generated by the sequencer circuits 106 controls an associated one of the toggle circuits 110A–110H. The eight outputs are generated sequentially by the clock generator 102 so that at any given time only one controlled circuit/individual device 56 or 60 may be engaged by the toggle circuits 110A–110H.

In the control circuitry 100, the clock 102 is preferably implemented using a '555 integrated circuit (IC)-based analog timer circuit 102, which provides an eight Hertz, 50% duty cycle clock signal. Each rising edge of the clock cycle engages an 8-bit sequencer IC 105, which is preferably implemented using a 74HC4017 (decade counter) type IC. The outputs of the sequencer IC 105, together with the output from the timer circuit 102, permit the eight toggle circuits 110A–110H to be engaged remotely by two-wire signals sent over the data bus 52.

A ninth output (Q9) from the sequencer IC 105 pulses high after each of the toggle circuits is selected (or enabled) for output control of the circuit breaker, so that modules 18 or 20 can be controlled sequentially. In a preferred embodiment, up to four modules 18 or 20 are coupled for sequential operation using the output Q9 as an enable signal, via invertor 108 and protection diode 110, to the next module 18" or 20" in the sequence. The previous module 18' or 20' in the sequence, if any, enables the illustrated arrangement through an OR gate 112 and RC circuit 113. The output of the OR gate 112 enables the sequencer IC 105 if Q9 is in its low state and the input from module 18' or 20' is in its low (enable) state.

The sequencer IC 105 is normally reset, and is released from reset, via OR gate 117 and R-C circuit 115, in response to an enable signal from the previous module 18' or 20'. The sequencer IC 105 is also reset through the OR gate 114 under certain conditions in response to the manual override push-on, push-off type switch 116 or by the input signal sent over bus 52 changing state. RC circuits 118 and 120 maintain the reset condition for at least the period of time specified for the sequencer IC 105. Capacitor 122 is positioned between the inputs of OR gate 114 to provide noise suppression.

The switch 116 and input signal from bus 52 are coupled to one another through a diode 126 and a resistor 128. If the input signal changes state from its normal high level to its active low level, and the switch 116 is providing a high level at resistor 128, a voltage drop across resistor 130 is detected by an RC circuit 132, which resets the sequencer IC 105 through diode 134. Similarly, with the switch 116 providing a high level, a voltage change from low to high across resistor 130 is detected by a second RC circuit 136 which also resets the sequencer IC 105 through diode 135. In a like manner, the sequencer IC 105 is reset if the input signal is in a high state, and the switch 116 is switched on or switched off. A capacitor 138 and a diode 140 provide the appropriate transient protection.

The input signals, via bus 52, and the toggle signal sent from the switch 116 are optically coupled to the controlled devices 56 or 60 through a dual isolation IC 150, preferably implemented using an NEC 2501-type IC. The isolation IC 150 is coupled to a pair of MOSFET transistors 152 and 154, e.g., IRFD110 type components available from International Rectifier, Inc., so that only one transistor 152 or 154 may be activated when the sequencer IC 105 provides an enable signal at line 156. High pass filters 158 and 160 substantially eliminate noise from activating the respective transistor and appropriately bias the transistor 152 and 154 on or off, respectively, when the isolation IC 150 is not engaged.

This isolated control to the controlled devices 56 or 60 is primarily implemented using the circuitry on the left side of the isolation IC 150. The select line 156, provided by the sequencer IC 105, is coupled to the anode of each isolation device, via resistor 162, in the isolation IC 150 so that it is disabled unless the sequencer IC 105 has selected (enabled) the toggle circuit 110A.

The input signal over bus 52 engages the controlled device 56 or 60 when the input signal is grounded. This operation implemented using a dual invertor arrangement 168A and 168B, which completes one of the diode paths in IC 150 so long as the select line 162 is high. This is not always the case, however. The switch 116 is configured so that it can always be engaged to override the command represented by the input signal and force the output (to controlled device 56 or 60) low. Thus, when the switch 116 is providing a low level, the input signal will not affect the toggle circuit 110A.

An LED (light emitting diode) circuit 164 is employed to reveal the present state of the controlled device 56 or 60 to the user. If the switch 116 (via diode 165) and the input signal are providing a high level, then the output to the controlled device 56 or 60 is high and the LED is off, which indicates that the controlled device is not engaged. If the input signal is low and the override function is not active, then the LED remains on, which indicates that the controlled device has been engaged remotely using the bus 52. Finally, if the override function is active (switch to ground), then the LED will flash as a result of the clock, which is coupled to the LED circuit through a diode 172.

In an exemplary embodiment, the resistors designated and described above as R1 are implemented using 10 kOhm values, those designated R2 are implemented using 100 kOhm values, and resistor 162 using a 240 Ohm value. As to the capacitors, those designated C1 are implemented using a 0.1 micro-Farad value, and those designated C2 are implemented using a 0.001 micro-Farad value.

While the invention has been particularly shown and described with reference to various embodiments, it will be recognized by those skilled in the art that other modifications and changes may be made to the present invention described above without departing from the spirit and scope thereof.

What is claimed is:

1. A module, which is responsive to a central controller in an energy management system, for providing command signals to control power to a plurality of appliance switches comprising:
   a plurality of toggle circuits, each respectively connected to one of the appliance switches for toggling the respective switch and each responsive to a signal provided by the central controller;
   a counting circuit which sequentially enables each one of the toggle circuits; and
   manual switch means, coupled to control the toggle circuits, for providing an override command signal to override at least one of the command signals provided by the central controller.

2. A module, according to claim 1, further including an LED which responds to both the signal provided by the central controller and the manual switch to indicate one of at least three states.

3. A module, according to claim 1, further including a plurality of said modules synchronously arranged so that control is provided to sets of appliance switches, wherein only one appliance switch is engaged at a time.

4. A module, according to claim 1, further including a reset circuit which resets the counting circuit in response to one of the toggling circuits toggling the switch means.

5. A module, according to claim 4, wherein the reset circuit is also responsive to an associated one of the command signals sent from the central controller.

6. A module, which is responsive to a central controller in an energy management system, for providing command signals to control power to a plurality of appliance switches comprising:
   a plurality of toggle circuits, each respectively connected to one of the appliance switches for toggling the respective switch and each responsive to a signal provided by the central controller;

a counting circuit which sequentially enables each one of the toggle circuits; and a plurality of manual switches, each of which is respectively associated with one of the toggle circuits and each configured with the respective toggle circuit to override at least one of the signals provided by the central controller.

7. A module, according to claim 6, further including a reset circuit which resets the counting circuit in response to one of the manual switches toggling the switch means.

8. A module, according to claim 6, further including a reset circuit which resets the counting circuit in response to one of the command signals sent from the central controller toggling the switch means.

9. A module, according to claim 6, further including a reset circuit having a signal transient detection circuit which detects a signal level change in one of the command signals sent from the central controller and which responds to an associated one of manual switches.

10. A module for providing command signals to a plurality of appliance switches, each of which is arranged to control at least one associated appliance in an energy management system, the module comprising:

a central controller for generating command signals for controlling power to the respective appliances;

a plurality of toggle circuits, each respectively connected to one of the appliance switches for toggling the respective switch in response to one of the command signals provided by the central controller;

a counting circuit which sequentially enables each one of the toggle circuits;

a plurality of manual switches, each of which is respectively associated with one of the toggle circuits and each configured with the respective toggle circuit to override at least one of the signals provided by the central controller; and counting circuit reset means, responsive to a signal level change in one of the command signals sent from the central controller and the manual switches, for resetting the counting circuit.

11. A power management and automation system for controlling power to a plurality of appliances in a facility, comprising:

a circuit breaker arrangement, responsive to a circuit breaker control signal, including a plurality of power switches through which power is provided to a plurality of associated appliances;

a central controller for generating commands signals to indicate when power to respective ones of the plurality of appliances should be provided;

a circuit breaker control module, responsive to the central controller, for generating the circuit breaker control signal, and including a plurality of toggle circuits, each respectively connected to one of the power switches for toggling the respective switch and each responsive to the circuit breaker control signal; and a counting circuit which sequentially enables each one of the toggle circuits; and manual switch means, coupled to control the toggle circuits, for providing an override command signal to override at least one of the command signals provided by the central controller.

12. A power management and automation system, according to claim 11, wherein the circuit breaker control module further includes an LED which responds to both the signals provided by the central controller and the manual switch means to indicate one of at least three states.

13. A power management and automation system, according to claim 12, wherein said three states include a first state indicating that an associated power switch is not engaged and a second state indicating that said associated power switch is engaged.

14. A power management and automation system, according to claim 13, wherein said three states include a third state which indicates that said associated power switch has been manually overridden using said manual switch means.

15. A power management and automation system, according to claim 12, wherein said three states include a state which indicates that an associated power switch has been manually overridden using the manual switch means.

16. A power management and automation system, according to claim 11, further including a plurality of said control modules synchronously arranged so that control is provided to sets of power switches, wherein only one power switch of all sets is engaged at a time.

* * * * *